United States Patent [19]
Nakanishi et al.

[11] Patent Number: 5,598,305
[45] Date of Patent: Jan. 28, 1997

[54] MAGNETIC RECORDING AND REPRODUCING DEVICE HAVING A LID MEMBER WHICH FORMS PART OF A GRIP

[75] Inventors: Atsushi Nakanishi, Tokyo; Mitsuo Hoshino, Saitama; Yoshitaka Matsumoto, Aichi, all of Japan

[73] Assignee: Sony Corporation, Tokyo, Japan

[21] Appl. No.: 704,389

[22] Filed: May 23, 1991

[30] Foreign Application Priority Data

May 30, 1990 [JP] Japan .................................. 2-140767

[51] Int. Cl.⁶ ............................................. G11B 15/675
[52] U.S. Cl. ............................................. 360/96.6
[58] Field of Search ................... 360/33.1, 96.5, 360/96.6, 83, 84, 99.06; 354/81; 358/906

[56] References Cited

U.S. PATENT DOCUMENTS

| | | | |
|---|---|---|---|
| 4,334,251 | 6/1982 | Sato | 360/96.6 |
| 4,547,815 | 10/1985 | Kimura | 360/33.1 |
| 4,614,991 | 9/1986 | Murakami | 360/96.6 |
| 4,686,593 | 8/1987 | Watanabe et al. | 360/96.6 |
| 4,706,141 | 11/1987 | Oba et al. | 360/96.6 |
| 4,794,478 | 12/1988 | Kamezawa et al. | 360/96.6 |
| 4,811,138 | 3/1989 | Park | 360/96.6 |
| 4,862,293 | 8/1989 | Saito et al. | 358/906 |
| 4,896,226 | 1/1990 | Araki et al. | 358/906 |
| 4,918,552 | 4/1990 | Tsutsumi et al. | 360/96.6 |
| 4,919,357 | 4/1990 | Lin | 360/96.5 |
| 4,984,112 | 1/1991 | Kletzl et al. | 360/96.6 |
| 5,105,317 | 4/1992 | Sugiyama et al. | 360/96.5 |
| 5,124,854 | 6/1992 | Iyota et al. | 360/96.6 |

FOREIGN PATENT DOCUMENTS

| | | | |
|---|---|---|---|
| 60-23061 | 11/1985 | Japan | 360/96.6 |
| 63-181157 | 7/1988 | Japan | 360/96.6 |
| 63-269366 | 11/1988 | Japan | 360/96.6 |
| 1-106386 | 4/1989 | Japan | 360/96.6 |

*Primary Examiner*—Jefferson Evans
*Attorney, Agent, or Firm*—William S. Frommer; Alvin Sinderbrand

[57] ABSTRACT

A magnetic recording and reproducing device includes a main body having a surface forming a gripping surface and also having a cassette insertion port through which a tape cassette can be loaded or unloaded, a cassette holder pivotally supported inside the main body of the device for holding the tape cassette and storing it at a tape cassette loaded position within the main body, a lid member for opening or closing the cassette insertion port as the cassette holder pivots and for forming part of the grip part when the cassette insertion port is closed, and a resilient member coupled to the cassette holder and the lid member for biasing the lid member toward the cassette holder when the cassette holder is stored at the tape cassette loaded position so that the circumferencial edge of the lid member abuts the circumferential edge of the cassette insertion port.

12 Claims, 5 Drawing Sheets

MAGNETIC RECORDING AND REPRODUCING DEVICE HAVING A LID MEMBER WHICH FORMS PART OF A GRIP

BACKGROUND OF THE INVENTION

1. Field of the Invention

The present invention relates to a magnetic recording and reproducing device and, more particularly, to a camera-mounted VTR having a cassette holder for holding a tape cassette having a gripping surface and a VTR deck.

2. Description of the Prior Art

In the case of the VTR (a video tape recorder), for example, a tape cassette may be inserted into a cassette insertion port located on a surface of the main body of the VTR and a cassette loading device then transfers the tape cassette to a tape cassette loaded position within the main body of the VTR. Referring to FIG. 5, this arrangement can be described briefly as follows. Reference numeral 50 denotes the main body of the VTR. A cassette holder 52 is pivotally supported inside the main body 50 of the VTR. A tape cassette 53 is inserted into the cassette insertion port 51 formed at an opening in the main body 50. The inserted cassette is then held by the cassette holder 52 and stored within the main body 50. A lid 54 is fixed to the cassette holder 52 through screws 55 or the like, and serves to open and close the cassette insertion port 51. the lid on cassette insertion port 51. Therefore, there may be a slight clearance between the circumferential edge 51a of the cassette insertion port 51 and the circumferential edge 54a of the lid 54 due to errors in measurement or the like, causing looseness between the lid and the cassette insertion port.

In order to make a smaller VTR, the cassette holder is fixed to the gripping surface of the main body of the VTR and a rotary head drum and a VTR deck comprised of a tape loading mechanism are arranged adjacent to the gripping surface. However, it is first necessary to resolve the problem of clearance and looseness by between the circumferential edge and the circumferential edge of the cassette holder 52 when the lid is also used as a gripping surface.

OBJECTS AND SUMMARY OF THE INVENTION

Accordingly, it is an object of the present invention to provide an improved magnetic recording and reproducing device which can avoid the problems encountered with the prior art.

More specifically, it is an object of the present invention to provide a magnetic recording and reproducing device capable of avoiding clearance between the circumferential edge of the cassette insertion port and the circumferential edge of the lid.

It is also an object of the present invention to provide a magnetic recording device in which the lid is biased toward the cassette holder when the cassette holder is stored at a tape cassette loaded position.

It is another object of the present invention to provide a magnetic recording device in which the relative position between the lid and the cassette holder are set when the lid is opened.

It is a further object of the present invention to provide a magnetic recording device in which a portion of the surface of the device defines a gripping surface having a cassette insertion port into which a tape cassette may be loaded or unloaded.

It is yet a further object of the present invention to provide a magnetic recording and reproducing device which is simple in construction, inexpensive to manufacture, and is compact and light.

The present invention relates to a magnetic recording and reproducing device such as a camera-mounted VTR comprised of a main body having a side surface of which a portion defines as a gripping surface. The surface also includes a cassette insertion port to permit a tape cassette to be loaded or unloaded therefrom. A cassette holder is pivotally supported within the main body of the device to hold the tape cassette and store it at a tape cassette loaded position within the main body of the device. A lid member, for opening or closing the cassette insertion port at the cassette holder pivot also forms part of the grip when the cassette insertion port is closed. A resilient member, placed between the cassette holder and the lid member, biases the lid member toward the cassette holder when the cassette holder is stored at a tape cassette loaded position within the main body and causes the circumferential edge of the cassette insertion port to abut the circumferential edge of the lid member, thus eliminating looseness between the two members. Using such an arrangement, the lid member may serve as part of the gripping surface.

The above, and other objects, features and advantages of the present invention, will become apparent from the following description, which is to be read with the accompanying drawings, and in which like reference numerals designate the same elements in the several views.

DESCRIPTION OF THE PREFERRED EMBODIMENT

Figure 1:
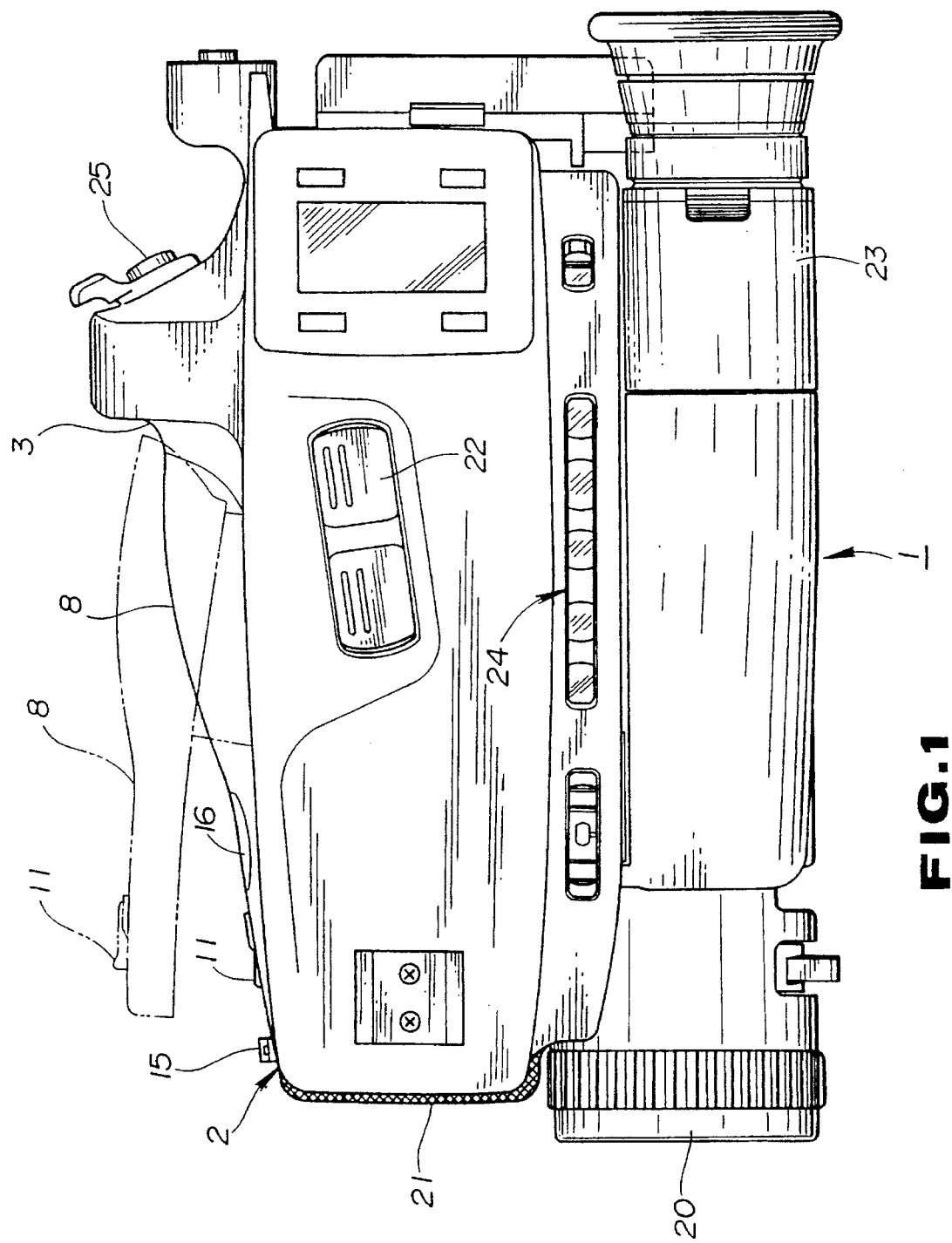
FIG. 1 is a top plan view of a camera-mounted VTR according to a preferred embodiment of the present invention.

Referring now to the drawings, a preferred embodiment of the present invention will be described in detail.

Referring initially to FIG. 1, a camera-mounted VTR 1 (a magnetic recording and reproducing device) is shown having a main body of synthetic resin of which a portion of one side surface defines a gripping surface 3. A camera lens 20, a microphone 21, a zoom operating button 22, a view finder 23, various operating buttons 24, and a recording button 25 are provided on the main body 2 of the VTR. The camera lens 20 is located at one end of the main body 2 of the VTR, referred to as the frontmost end of the VTR, and the view finder 23 is located at the opposite end of the main body 2 of the VTR, referred to as the rearmost end.

Figure 2:
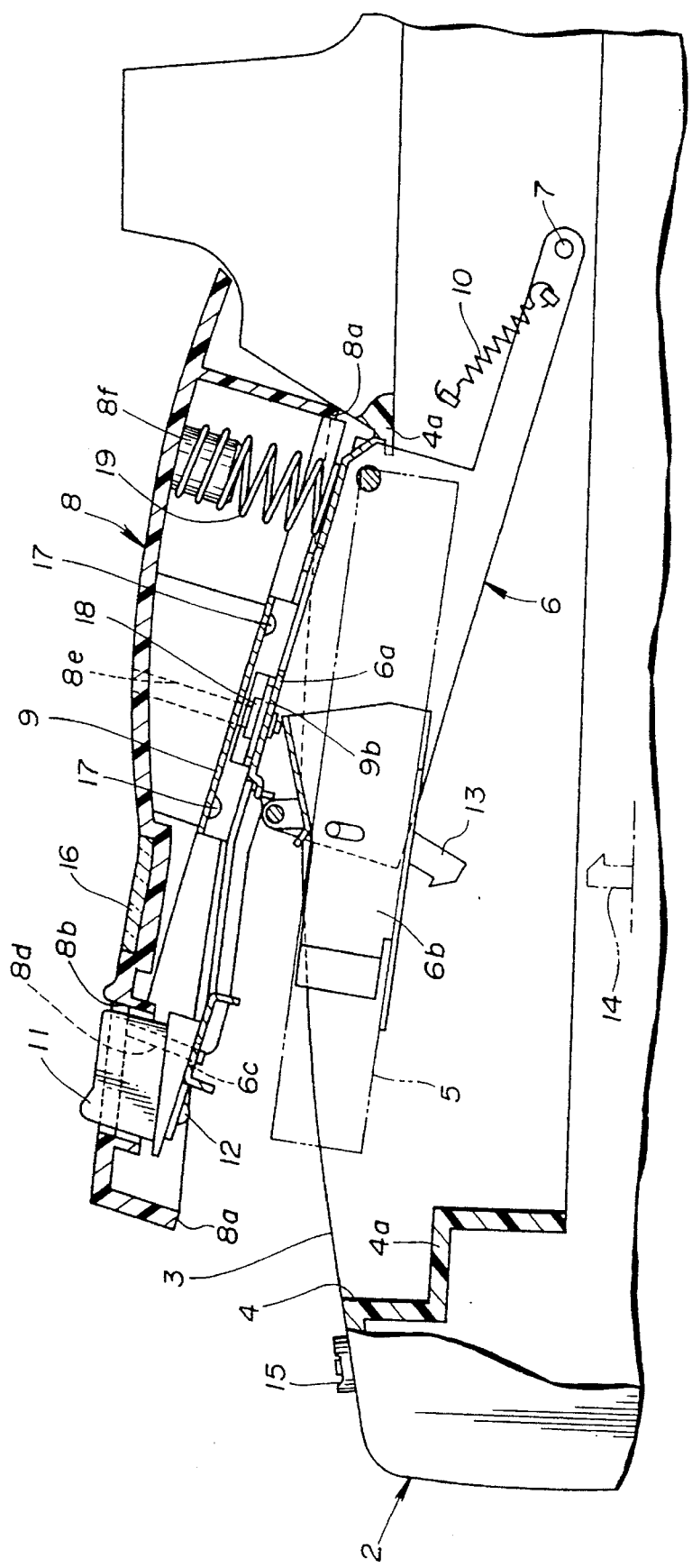
FIG. 2 is a sectional view of a substantial part of the VTR when the cassette insertion port of the VTR is opened.
Figure 3:
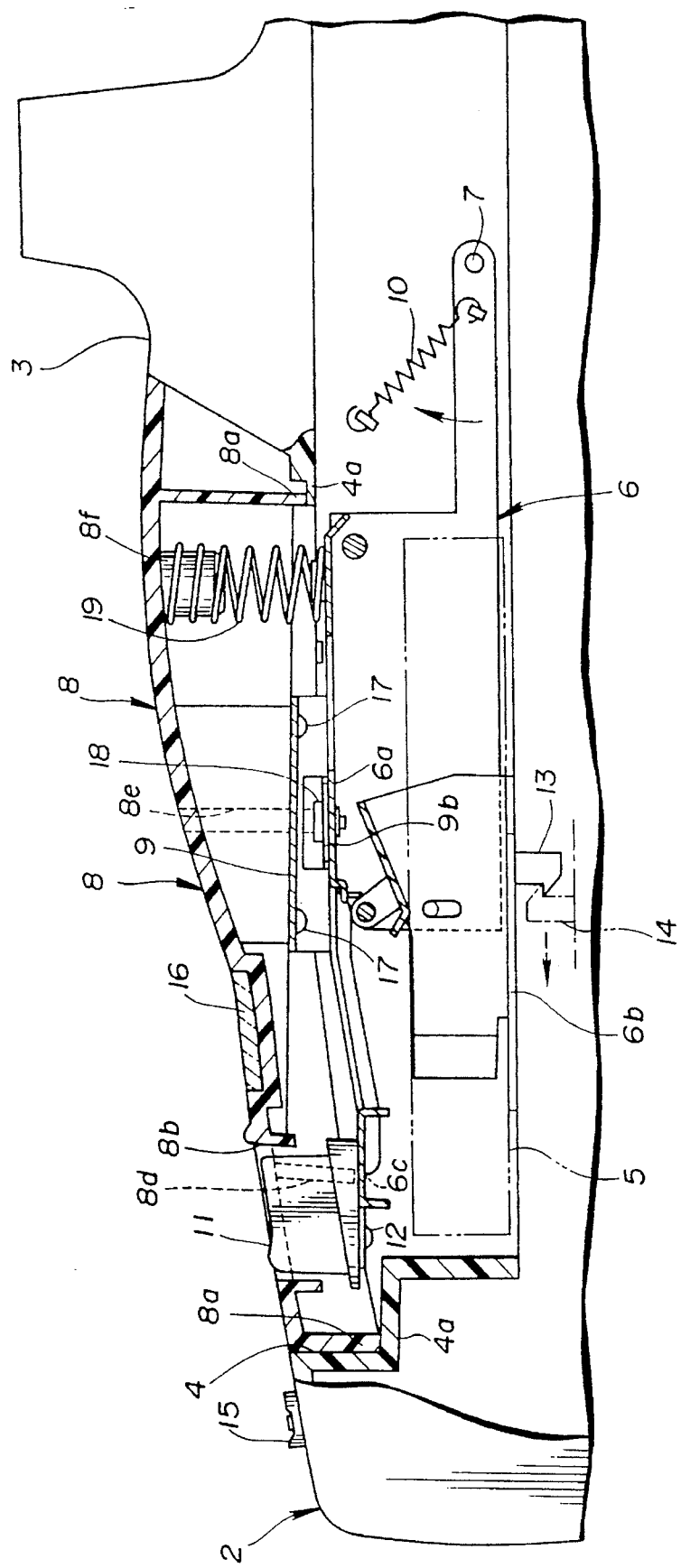
FIG. 3 is a sectional view of a substantial part of the VTR when the cassette insertion port of the VTR is closed.

Referring now to FIGS. 2 and 3, the main body 2 of the camera mounted VTR is further comprised of a cassette insertion port 4 into which a tape cassette 5 may be loaded or unloaded when the cassette insertion port 4 is opened. Located within the main body 2 of the VTR is a cassette holder 6 which is pivotally supported at the one end by a pair of supporting shafts 7 and 7 attached to the inside of the main body 2. The cassette holder is able to hold a tape cassette 5 proximate to a VTR deck (not shown) which is composed of a rotary head drum and a tape loading mechanism or the like. Coupled to the cassette holder 6 is a lid member 8 for opening or closing the cassette insertion port 4 when the cassette holder 6 is pivoted about supporting shafts 7 and 7. The lid member 8 also forms part of the gripping surface 3 when the cassette insertion port 4 is closed. To provide the coupling between the cassette holder 6 and the lid member 8, a leaf spring (or other resilient member) 9 is attached to both the cassette holder 6 and the lid member 8 for biasing the lid member 8 toward the cassette holder 6 as the cassette holder 6 is pivoted to a tape cassette loaded position within the main body 2, thereby causing the circumferential edge 8a of the lid member 8 to abut the circumferential edge 4a of the cassette insertion port 4. A tension coil spring 10 is attached to inside of the main body 2 of the VTR and to the base of the cassette holder 6 near the supporting shafts 7 and 7 for biasing the cassette holder 6 in clockwise direction A when the lid member 8 is opened.

The cassette holder 6 is comprised of a holder body 6a and a cassette mounting member 6b. The holder body 6a is made of metal and is of an inverted ⌐-shape as viewed from the frontmost end. The holder body is pivotally supported at one end by a pair of supporting shafts 7 and 7. The cassette mounting member 6b is made of metal and each side edge of the cassette mounting member is bent into an L-shape, forming sideparts. Each sidepart of the cassette mounting member 6b is supported by a pin extending from the sidepart and passing through a slot located in the corresponding sidepart of the holder body 6a, thereby allowing the cassette member 6b to pivot about the pins. A push button 11 made of synthetic resin is affixed to the center of the frontmost end of the holder body by a small screw 12 and projects outward through an opening 8b in the lid member 8. Projecting from the bottom of the holder body 6a is a keeper 13 for holding the holder body 6a against the force of the tension coil spring 10. By depressing the push button 11 and thus engaging the keeper 13 with a locking latch 14 the holder body 6a is stored within the main body 2 of the VTR at a tape cassette loaded position. An eject button 15 is located near the cassette insertion port 4 and can be depressed to slide and electrically move the locking latch 14 in frontward direction B, as shown in FIG. 3. When the locking latch 14 moves in frontward direction B, the keeper 13 is released, permitting the cassette holder 6 to pivot in clockwise direction A under the force of the tension coil spring 10. As the cassette holder 6 pivots, the locking latch 14 is electrically returned to its original position.

Figure 4:
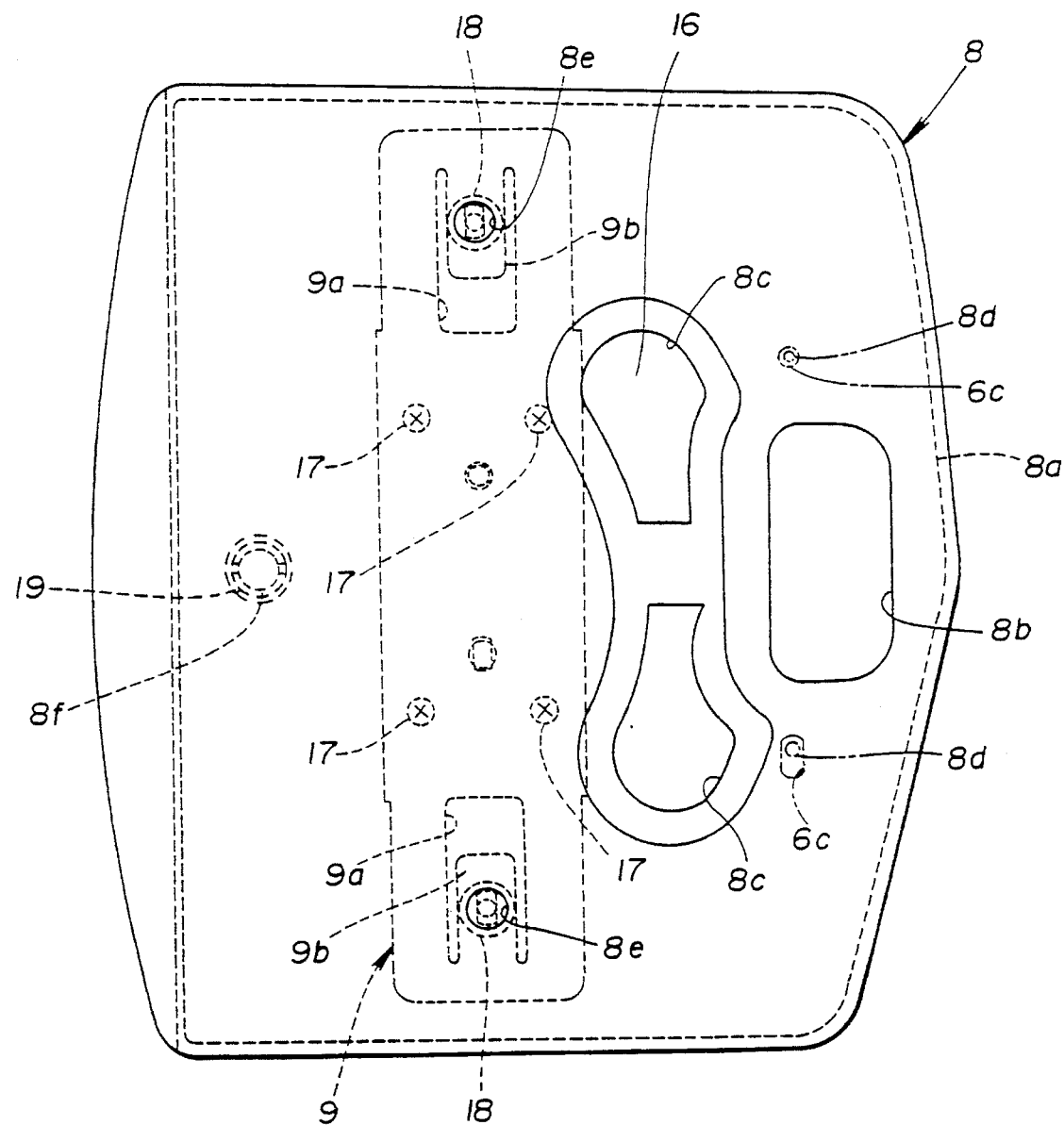
FIG. 4 is a front elevational view of a lid member used as part of the gripping surface of the VTR.
Figure 5:
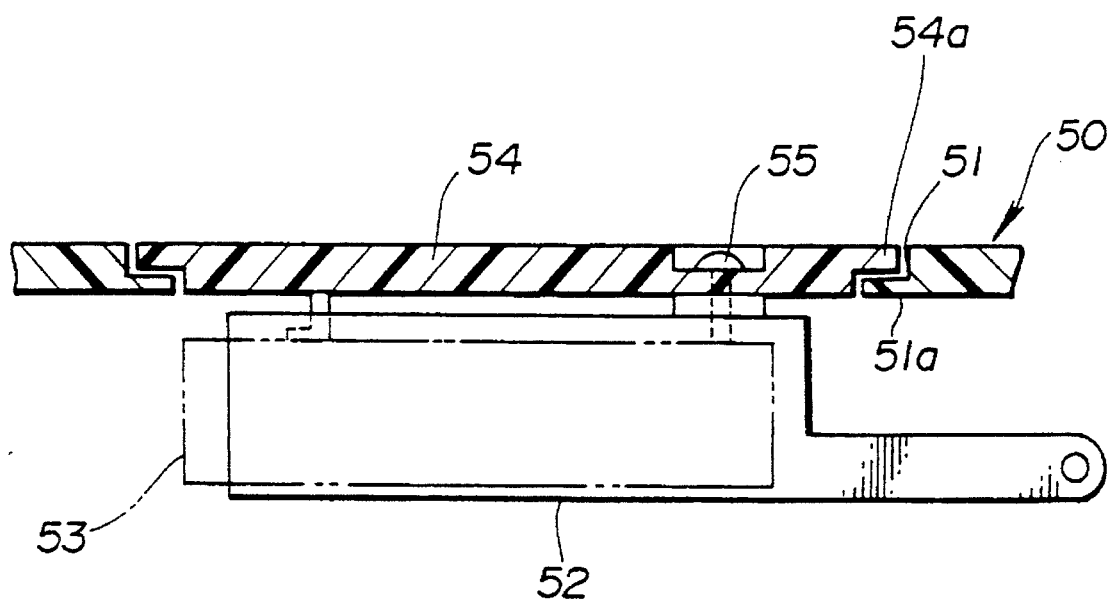
FIG. 5 is an illustration of the prior art cassette loading device.

Referring now to FIG. 4, the lid member 8 is made of synthetic resin and forms a plate with a circumferential edge 8a that conforms to the circumferential edge 4a of a cassette insertion port 4. As described above, an opening 8b for push button 11 is located at the frontmost end of the lid member 8 and surrounds the push button 11. A pair of opening windows 8c and 8c are located to the rear of opening 8b of the lid member 8. The pair of opening windows 8c and 8c support a transparent plate 16 made of resin, through which a tape cassette 5 held by the cassette mounting member 6b can be seen. A pair of projections 8d and 8d are positioned over a pair of position setting holes 6c and 6c and are attached to the bottom surface of the lid member 8. Located near each side edge of lid member 8 are threaded communication holes 8e and 8e. Also present is a cylindrical projection 8f attached to the bottom surface of the lid member 8 and halfway between the side edges and near the rearmost end.

The leaf spring 9 is made of metal and is of a rectangular shape. Near each end of the leaf spring 9 are ⊃-shaped cuts 9a and 9a forming a pair of projecting pieces 9b and 9b. The center area of the leaf spring 9 is affixed to the center area of the bottom surface of the lid member 8 either by screws 17 or by melting and adhering or the like. The pair of projecting pieces 9b and 9b are affixed to the holder body 6a of the cassette holder 6 by screws 18 to threaded holes 8e and 8e. Using such an arrangement, the lid member 8 is resiliently coupled to the cassette holder 6.

A compression coil spring 19, located between the holder body 6a and the lid member 8 is held by cylindrical projection 8f. When the cassette insertion port 4 is fully opened (see FIG. 2), the compression coil spring 19 causes the lid member 8 to travel toward the cassette holder 6 causing the pair of projections 8d and 8d of the lid member 8 to rest within the pair of position setting holes 6c and 6c of the main body 6a of the cassette holder 6 so as to position the cassette holder 6 and the lid 8 relative to each other.

Alternatively, when the cassette insertion port 4 is fully closed (see FIG. 3), the circumferential edge 8a of the lid member 8 is abutted to the circumferencial edge 4a of the cassette insertion port 4. At the same time, the cassette holder 6 is locked in a cassette loaded position, pulling down the cassette holder 6 and causing the pair of projections 8d and 8d of the lid member 8 to be moved away from the pair of position setting holes 6c and 6c of the cassette holder 6. As a result, the tension force of the leaf spring 9 is stronger than the compression force of the compression coil spring 19, pulling the lid member 8 toward the cassette holder 6.

Referring to FIGS. 2 and 3, and to the sequence of operation in the above-described preferred embodiment of the camera-mounted VTR 1, the cassette insertion port 4 of the main unit 2 of the VTR is initially open as shown in FIG. 2. To close the cassette insertion port 4, button 11 of the cassette holder 6 is depressed causing the cassette holder 6 to pivot about supporting shafts 7 and 7 in a counterclockwise direction. Because the lid member 8 is coupled to the main body 6a of the cassette holder 6 through the leaf spring 9, the lid member 8 is urged in the same direction. As the cassette holder 6 and the lid member 8 travel, the circumferential edge 8a of the lid member 8 is brought in contact with the circumferential edge 4a of the cassette insertion port 4. As the push button 11 is further depressed, the cassette holder 6 is pivoted to a tape cassette loaded position, and the keeper 13 of the cassette holder 6 is engaged with the locking latch 14 locking the cassette holder 6 in the tape cassette loaded position. At the same time, the cassette holder 6 is pivoted to a tape cassette loaded position, the pair of projection pins 8d and 8d of the lid member move out of the pair of position setting holes 6c and 6c and the cassette holder 6 and the main unit 6a of the cassette holder 6 pulls the pair of projecting pieces 9b and 9b of the leaf spring 9, which are attached to it, thereby pulling on the leaf spring 9 and increasing the tension of the leaf spring. As a result, the lid member 8, which is attached to the leaf spring 9 is pulled toward the cassette holder 6 by the leaf spring 9. Thus, when the cassette holder is locked in the cassette loaded position, the lid member 8 remains tensioned toward the holder main unit 6a of the cassette holder 6, and the circumferential edge 8a of the lid member 8 remains abutted to the circumferential edge 4a of the cassette insertion port 4. Thus, any loosening between the two circumferencial edges is eliminated.

Because there is no looseness between the circumferential edge 8a of the lid member 8 and the circumferential edge 4a of the cassette insertion port 4, the lid member 8 can serve as a part of the gripping surface 3 of the main unit 2 of the VTR and the VTR deck part can therefore be located near the gripping surface 3. Thus, the camera-mounted VTR 1 can be made smaller.

When a cassette is to be loaded or unloaded, the lid member 8 is opened by sliding eject button 15 causing the locking latch 14 to move in frontward direction B of FIG. 3 thereby releasing the keeper 13 of the cassette holder 6. As the keeper 13 of the cassette holder 6 is released, the cassette holder 6 is released from the tape cassette loaded position and then caused to pivot in clockwise direction A of FIG. 3 under the force of the tension coil 10. As the cassette holder 6 pivots, the lid member 8 is urged in the same direction. At the same time, the lid member 8 is caused to travel toward the cassette holder 6 by the force of compression coil spring 19, causing the pair of projections 8d and 8d of the lid member to travel into the pair of position setting holes 6c and 6c of the main body 6a of the cassette holder 6 to position the cassette holder 6 and the lid member 8 relative to each other (see FIG. 2). Using such an arrangement, the cassette insertion port 4 is opened and a tape cassette 5 can be loaded into or unloaded from the cassette holder 6. When the cassette insertion port 4 is again closed by closing the lid member 8 in the previously described manner, the circumferential edge 8a of the lid member 8 is again abutted to the circumferential edge 4a of the cassette insertion port 4.

By way of a summary of the preferred embodiment illustrated in FIGS. 1–4, it is to be noted that, in accordance with the present invention, when the cassette holder holding a tape cassette is locked into a tape cassette loaded position within the main body of the device, a resilient member pulls the lid member toward the cassette holder such that the circumferential edge of the cassette insertion port is abutted to the circumferential edge of the lid member, preventing looseness between the two circumferential edges. Using such an arrangement, the lid member can readily serve as part of the gripping surface of the main body of the device.

It is also to be noted that the preferred embodiment of the magnetic recording and reproducing device of the present invention is not limited to the camera-mounted VTR, but may alternatively be an audio tape recorder. Similarly, the resilient member is not limited to a leaf spring, but may instead be a coil spring or the like. It is to be further noted that although the preferred embodiment of the present invention has been described in detail herein with reference to the accompanying drawings, it is to be understood that the present invention is not limited to the precise embodiment and that many changes and modifications could be effected therein by one skilled in the art without departing from the spirit and scope of the invention as defined in the appended claims.

What is claimed is:

1. A magnetic recording and reproducing device comprising:

a main body having a portion with a surface defining a grip to permit said device to be hand held, said surface having a cassette insertion port therein dimensioned to permit a tape cassette to be loaded or unloaded through said insertion port;

a cassette holder pivotally supported by said main body for movement between a cassette receiving position at which said holder can receive a cassette through said port, and an operative position in which a tape cassette in said holder is disposed in a tape cassette loaded position within said main body;

a lid member mounted on said holder for limited movements in respect to the latter and being movable with said holder between opened and closed positions with respect to said cassette insertion port in response to pivoting of said cassette holder between said cassette receiving and operative positions, respectively, said lid member forming a part of said grip when in said closed position; and a spring member coupled to said cassette holder and to said lid member for pulling said lid member toward said cassette holder when said cassette holder is in said operative position and thereby securely abutting a circumferential edge of said lid member against a circumferential edge of said cassette insertion port.

2. A magnetic recording and reproducing device according to claim 1 wherein said spring member includes a leaf spring, and wherein said lid member is pulled toward said cassette holder by the force of said leaf spring.

3. A magnetic recording and reproducing device according to claim 1 wherein said lid member has a projection and wherein said cassette holder has a position setting hole into which said projection may be inserted such that when said lid member is opened, said projection is inserted into said position setting hole thereby setting the relative position between said lid member and said cassette holder.

4. A magnetic recording and reproducing device according to claim 3 further comprising a second spring member coupled to said cassette holder and to said lid member for urging said projection into said position setting hole when said lid member is opened.

5. A magnetic recording and reproducing device according to claim 1 wherein said lid member has a window through which a cassette held by said cassette holder can be seen.

6. A magnetic recording and reproducing device according to claim 1 further comprising a VTR deck, and wherein said operative position of said cassette holder is proximate to said VTR deck.

7. A magnetic recording and reproducing device according to claim 1 wherein said cassette holder comprises a single pair of spring loaded arms respectively located at opposing ends of said cassette holder, said cassette holder pivotally supported by said main body by pivotally connecting said pair of arms to said main body along a single axis.

8. A magnetic recording and reproducing device comprising:

a main body having a portion with a surface defining a grip to permit said device to be hand held, said surface having a cassette insertion port therein dimensioned to permit a tape cassette to be loaded or unloaded through said insertion port;

a cassette holder having a single pair of spring loaded arms respectively located at opposing ends of said cassette holder, said pair of arms pivotally connected to said main body along a single axis for movement of said cassette holder between a cassette receiving position at which said cassette holder can receive a cassette through said port and an operative position in which a tape cassette in said cassette holder is disposed in a tape cassette loaded position within said main body;

a spring member coupled to said cassette holder;

a lid member coupled to said spring member and being movable with said cassette holder between opened and closed positions with respect to said cassette insertion port in response to pivoting of said cassette holder between said cassette receiving and operative positions, respectively, said lid member forming a part of said grip when in said closed position;

wherein when said cassette holder is brought in proximity to said operative position from said cassette receiving position, a circumferential edge of said lid member abuts a circumferential edge of said cassette insertion port, and when said cassette holder is further brought to said operating position, said cassette holder pulls said spring member causing said spring member to pull said lid member, thereby securely abutting the circumferential edge of the lid member to said circumferential edge of said cassette insertion port.

9. A magnetic recording and reproducing device according to claim 8 wherein said spring member includes a leaf spring.

10. A magnetic recording and reproducing device according to claim 8 wherein said lid member has a projection and wherein said cassette holder has a position setting hole for receiving said projection such that when said lid member is opened, said projection is inserted into said position setting hole thereby setting the relative position between said lid member and said cassette holder.

11. A magnetic recording and reproducing device according to claim 10 further comprising a second spring member coupled to said cassette holder and to said lid member for urging said projection into said position setting hole when said lid member is opened.

12. A magnetic recording and reproducing device according to claim 8 further comprising a VTR deck, and wherein said operative position of said cassette holder is proximate to said VTR deck.

* * * * *